Patented Sept. 15, 1936

2,054,734

UNITED STATES PATENT OFFICE 2,054,734

FUEL CARBURETING OR VAPORIZATION MEANS FOR INTERNAL COMBUSTION ENGINES

Hector Akast and Roy Keith Smith, Whangarei, New Zealand

Application April 26, 1935, Serial No. 18,464
In New Zealand June 22, 1934

4 Claims. (Cl. 261—18)

The invention has been devised, with the object of providing improved means for utilizing crude or heavy oils or alcohol as the power fuel for an internal combustion engine, in connection with which, it is known to provide carbureting apparatus designed to be brought into use after the engine has been started and warmed up or primed by the use of the lighter and refined power oils such as petrol, benzine and the like.

It is also known in connection with means used for carbureting benzine, petrol and the like, that a fan or propeller like device has been fitted in the induction line of an engine to be acted upon by the induction of the latter and have rotary motion imparted thereto, for the purpose of providing an improved fuel mixture to be supplied to the engine, while in some cases fixed vanes or blades have been fitted in the induction pipe to cause a swirling motion to be imparted to the fuel mixture; the object in both cases being to obtain more complete mixing or intermingling of the component parts of the mixture in an endeavour to secure improved combustion thereof.

The means provided by the present invention have been designed to ensure thorough atomization of the component parts of the fuel mixture i. e. oil and water when the latter is used, and intimate intermixing or intermingling of said parts with each other and with the air present so as to enable a highly efficient fuel mixture to be passed to the engine by the use of a low grade fuel, and to effect economy in the use of higher grade fuels.

The invention provides for the combination with any suitable carbureting means, of a rotary atomizer comprising a plurality of propeller like devices rotatably fitted within a bore in the induction line of the engine and in communication with the carbureting means, said devices being formed and arranged so that when acted upon by the induction of the engine some of them are rotated in the reverse direction, to the direction of rotation of the remaining propeller like devices, whereby there is provided effective means for reducing oil and water to a very finely divided state which is necessary if complete intermixing or intermingling of said component parts with each other, or either of them with air, is desired.

The invention further resides in the provision of an improved construction of oil carbureting means, wherein there are provided a vertically extending cylindrical casing open at its lower end to atmosphere, and having its upper end adapted for connection with the engine induction intake, the bore of said casing containing a portion of reduced diameter; an air nozzle arranged to open upwards from the lower end of the casing bore, and having its discharge end entered centrally in said portion of reduced diameter; valvular means for controlling the passage of air through said air nozzle; and an oil fuel nozzle provided with valvular means for controlling the passage of oil therethrough fitted to said casing, so that its discharge end enters said portion of reduced diameter radially, at a point above the discharge end of the air nozzle.

The invention still further provides for the incorporation in the carbureting means, of a nozzle for the supply of water to the oil and air mixing chamber, said nozzle being provided with valvular means whereby the water drawn in under the suction of the engine, can be regulated in quantity to give the required combustible mixture.

The invention is illustrated in the accompanying drawing and will be hereinafter described in relation to such drawing, in which:—

Figure 1:
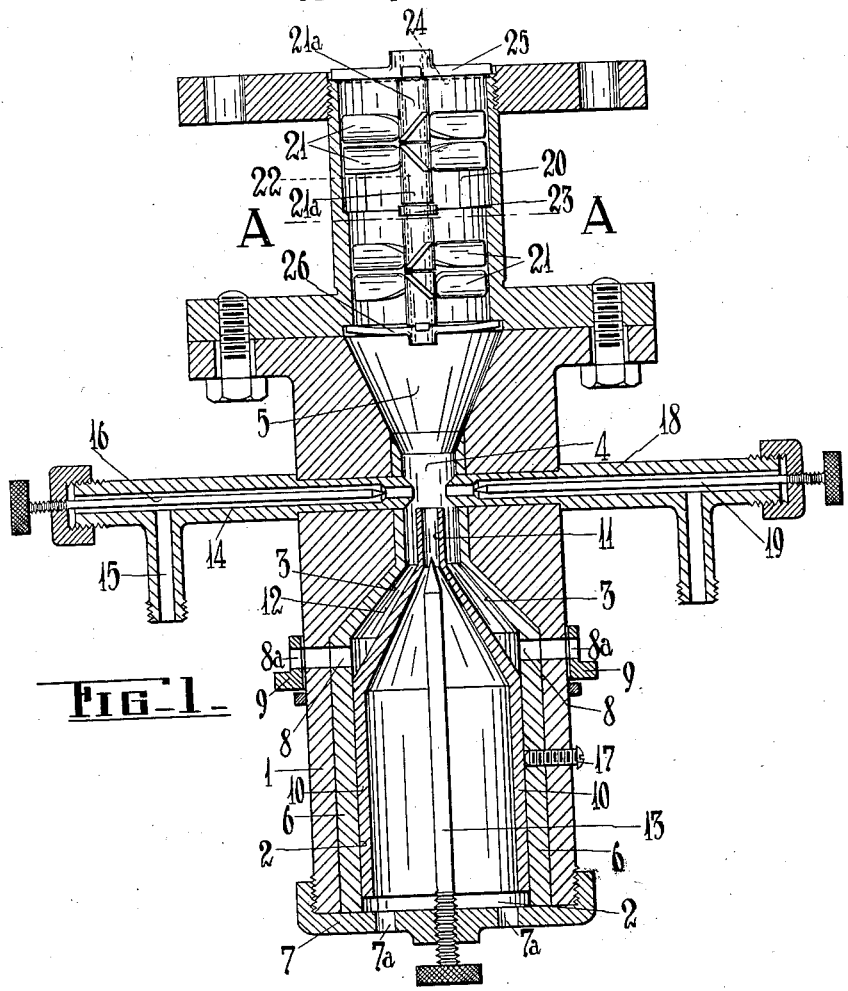
Figure 1 is a sectional elevation of the complete apparatus.
Figure 2:
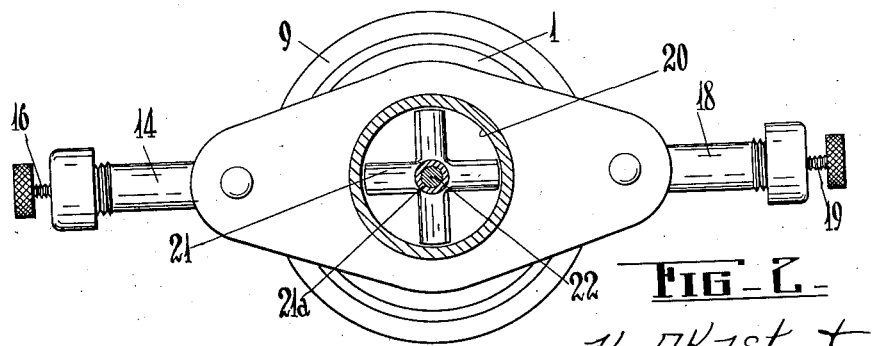
Figure 2 is a sectional plan on the line A—A of Figure 1.

In giving effect to the invention, there is provided a vertical cylindrical casing 1, formed with a large bore 2 in its lower end, said bore 2 tapering as at 3 to a reduced portion 4 of relatively small bore, from which latter an expanding portion 5 opens out to approximately the full bore at the upper end of the casing 1. The casing bore with the exception of the expanding portion 5, may be lined with a fixed sleeve 6 as shown, if so desired. The lower end of the cylinder is provided with a cover plate 7 having a number of air entry holes 7a therein. The casing 1 is also formed with a ring of apertures 8 formed therein at about the upper end of the large bore 2, and around these apertures 8, a collar ring 9 is mounted on the casing 1, so that it may be turned thereon. This ring 9 also contains apertures 8a which latter may be brought more or less into coincidence with the apertures 8, or be entirely shut off therefrom, and the apertures 8 closed by solid portions of the ring 9 through the appropriate movement of the latter upon the casing 1. In this manner provision is made for regulating the air entry area through these radial apertures 8, or for entirely shutting off the air.

An air nozzle fitting, arranged within the bore 2 of the casing 1 comprises a lower tubular portion 10 which at its upper end tapers to a relatively small nozzle outlet 11. The tubular portion 10 is held in the casing 1 so that the nozzle outlet 11 extends into the reduced portion 4 of the bore of the casing, projecting centrally up therein and leaving an annular space 12 between it and the tapered portion 3 and the upper end of the larger bore 2 where the apertures 8 are located. This nozzle fitting acts thus to direct air entering through the entry holes 7a in the cover 7 at the bottom of the casing 1, up through the device to the centre of the reduced portion 4. In order to regulate the amount of air that may pass through the nozzle outlet 11, there is provided a needle valve 13, the stem of which is screwed up through the cover plate 7 so that its point enters the lower end of said nozzle outlet 11, and by adjustment therein, regulates the amount of opening in a well known manner.

Thus with the engine induction acting through the upper end of the device, air is drawn in through the apertures 7a to be concentrated into jet form as it issues from the nozzle outlet 11 upwardly through the reduced portion 4. At the same time air may be drawn in through the apertures 8 to pass upwardly around the nozzle outlet 11, and up into the reduced portion 4, according to whether such apertures 8 are left open or closed. In each instance the quantity of air thus drawn in may be regulated.

The oil fuel is led in through a nozzle 14 arranged to project into the reduced portion 4 of the casing bore at right angles to it, and to emerge thereinto at a point above the air outlet nozzle 11. This oil nozzle 14 is connected with the source of supply through a branch 15 leading down from its outer end to a storage reservoir of any suitable nature, as for instance, an ordinary float controlled chamber in which the level of the oil is maintained at a distance beneath the level of the nozzle 14, in order thus to obviate the liability of a gravity flow of oil through the nozzle. The nozzle passage is controlled by means of a needle valve 16 to provide for the oil feed being regulated.

The air current passing up through the nozzle 11 will thus, as it crosses the outlet of the oil nozzle 14, act inductively to induce an inflow of oil fuel to mix with the air, the relative proportions of air and oil being regulated by the adjustment of the respective needle valves 13 and 16 to suit any special requirement.

The inductive force of the air current upon the oil supply may be correctly fixed, by providing for the air nozzle fitting being adjustable up and down within the casing 1. For this purpose it may be fitted to slide in said casing 1 and then be locked at any required position by means of the set screw 17 screwing through the casing wall and engaging the tubular portion 10 of the fitting to jamb it in position.

Should the mixture of air and oil formed in the reduced portion 4 and passing out into the expanding portion 5 require a further proportion of air, the latter may be obtained through the apertures 8, the air currents passing through them also acting to assist in the inductive action on the fuel supply.

There is also provided a further nozzle 18 made to project into the reduced portion 4 of the casing bore at a point above the nozzle outlet 11, this nozzle 18 being fitted with a needle valve 19 and being used to supply water, when required, to the reduced portion or mixing chamber 4, in a manner similar to that under which the oil is supplied to said chamber 4.

In order to obtain a more intimate intermixing or intermingling of the air and oil, and also the water, (if the latter is used), sprayed into the mixing chamber 4, there is provided a chamber 20 arranged as an extension from the upper end of the bore of the casing 1, so that the engine induction acts through it and also through the expanding portion 5 in which the fuel mixture expands after leaving the reduced portion 4. Fitted within the chamber 20, to extend across its cross-sectional areas, are any desired number of propeller like devices 21 disposed one above the other upon a central spindle 22 suitably supported in the chamber 20 as by spiders 25, 26. These propeller like devices 21 are so formed that the blades or vanes of the devices 21 are in staggered relationship, and the set or angle of inclination of each set of blades or vanes is oppositely inclined, to the sets of blades or vanes above and below it. The propeller like devices 21 are arranged in pairs upon the spindle 22, the bosses 21a of said devices being formed so that the blades or vanes of the members of each pair thereof can be brought closely together and also so that spaces are left between the pairs and between the latter and the ends of the chamber 20, while a collar 23 separates the bosses 21a of adjoining pairs of devices 21.

The induction of the engine, as it draws the mixture formed in the reduced portion 4, through the chamber 20, causes the oil particles to be impacted against the blades or vanes of the devices 21 and each of the latter to be rotated in the reverse direction to its fellow member about the spindle 22 casing the mixture being drawn through the chamber 20 to be broken into an exceedingly fine state of division, which ensures intimate intermixing or intermingling of the oil with the air and rendering the mixture highly efficient and suitable for use in internal combustion engines under usual conditions.

If water is supplied to the mixture, it will be treated by the propeller like devices 21 in a like manner and be atomized and brought into complete combination or mixture with the oil fuel and air.

The blades or vanes of the propeller like devices 21 are preferably parallel sided and with more or less square tips, as it is found that with this form of blade or vane, the greatest degree of efficiency in atomization is obtained.

The outlet end of the chamber 20 can be provided with a perforated grid or strainer 24 to prevent solid matter passing from the chamber 20 to the induction pipe.

Preferably the internal diameter of the inlet end of the chamber 20 is less than that of the outlet end, the propeller like devices 21 adjacent the outlet end being larger than those adjacent the inlet end, so that mixture passing between the ends of the smaller devices 21 and the wall of the chamber 20 is caught and atomized by the larger devices 21.

What we do claim and desire to obtain by Letters Patent of the United States of America is:—

1. Oil fuel carbureting means for internal combustion engines, comprising a vertically extending cylindrical casing open at its lower end to atmosphere, and having its upper end adapted for connection with the engine induction intake, the bore of said casing containing a portion of reduced diameter; an air nozzle arranged to open upwards from the lower end of the casing bore, and having its discharge end entered centrally in said portion of reduced diameter; valvular means for controlling the passage of air through said air nozzle; and an oil fuel nozzle provided with valvular means for controlling the passage of oil therethrough fitted to said casing, so that its discharge end enters said portion of reduced diameter radially, at a point above the discharge end of the air nozzle, the upper portion of the air nozzle being tapered and the adjacent portion of said bore immediately below the portion of reduced diameter being correspondingly tapered to provide an annular space between said air nozzle and said casing, and means for supplying air to said annular air space.

2. Oil fuel carbureting means for internal combustion engines, comprising a vertically extending cylindrical casing open at its lower end to atmosphere, and having its upper end adapted for connection with the engine induction intake, the bore of said casing containing a portion of reduced diameter; and air nozzle arranged to open upwards from the lower end of the casing bore, and having its discharge end entered centrally in said portion of reduced diameter; valvular means for controlling the passage of air through said air nozzle, and an oil fuel nozzle provided with valvular means for controlling the passage of oil therethrough fitted to said casing, so that its discharge end enters said portion of reduced diameter radially, at a point above the discharge end of the air nozzle, a cylindrical chamber in communication with the upper end of the casing, a plurality of bladed propeller-like devices fitted in said chamber and all adapted to be rotated under the action of the engine induction and formed and fitted so that some of said devices are adapted for rotation in reverse direction to the remaining propeller-like devices, a spindle, said propeller-like devices being arranged in pairs on said spindle, and the blades of each pair of devices being inclined so that a member of each pair of devices rotates in the reverse direction to the adjacent member.

3. Oil fuel carbureting means as in claim 2, wherein the members of the pairs of propeller like devices are placed closely together and also wherein said pairs are spaced apart on the common spindle.

4. Oil fuel carbureting means as in claim 2 wherein the propeller like devices are formed with parallel sides and with approximately square tips.

HECTOR AKAST.
ROY KEITH SMITH.